US011280302B2

(12) United States Patent
Hamazume et al.

(10) Patent No.: US 11,280,302 B2
(45) Date of Patent: Mar. 22, 2022

(54) INTAKE DEVICE FOR ENGINE

(71) Applicant: Mazda Motor Corporation, Hiroshima (JP)

(72) Inventors: Yoshihiro Hamazume, Aki-gun (JP); Takashi Yoshikawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/206,504

(22) Filed: Mar. 19, 2021

(65) Prior Publication Data

US 2021/0363947 A1    Nov. 25, 2021

(30) Foreign Application Priority Data

May 20, 2020    (JP) .............................. JP2020-087805

(51) Int. Cl.
*F02M 35/112* (2006.01)
*F02M 35/10* (2006.01)
(Continued)

(52) U.S. Cl.
CPC .... *F02M 35/112* (2013.01); *F02M 35/10222* (2013.01); *F02M 26/22* (2016.02); *F02M 26/65* (2016.02)

(58) Field of Classification Search
CPC .. F02M 35/10222; F02M 26/22; F02M 26/23; F02M 26/17; F02M 26/41
See application file for complete search history.

(56) References Cited

U.S. PATENT DOCUMENTS

| | | | |
|---|---|---|---|
| 9,926,895 B2 * | 3/2018 | Sudo | F02M 35/1036 |
| 2005/0205071 A1 * | 9/2005 | Sullivan | F02M 35/1038 |
| | | | 123/568.18 |

(Continued)

FOREIGN PATENT DOCUMENTS

| | | |
|---|---|---|
| EP | 3447276 A2 | 2/2019 |
| EP | 3480449 A1 | 5/2019 |

(Continued)

OTHER PUBLICATIONS

English machine translation of description provided by ESPACENET for JP 2016102429 A (Year: 2021).*

(Continued)

*Primary Examiner* — Michael A Kessler
(74) *Attorney, Agent, or Firm* — Alleman Hall Creasman & Tuttle LLP

(57) ABSTRACT

An intake device for an engine is provided which can inhibit excessive cooling of EGR gas. In the intake device including an intake passage, an EGR passage, and an EGR cooler, the intake passage is provided with a lateral-side intake passage portion provided on one side of an engine body in a vehicle width direction, the EGR passage is provided with a downstream-side EGR passage portion defining the EGR passage on a downstream side of the EGR cooler and provided on the one side of the engine body in the vehicle width direction, and the downstream-side EGR passage portion is disposed such that at least a portion thereof is positioned rearward of the lateral-side intake passage portion and overlaps with the lateral-side intake passage portion when seen from the front of a vehicle.

13 Claims, 9 Drawing Sheets

(51) Int. Cl.
*F02M 26/22* (2016.01)
*F02M 26/65* (2016.01)

(56) References Cited

U.S. PATENT DOCUMENTS

| | | | | |
|---|---|---|---|---|
| 2007/0068498 A1* | 3/2007 | Hataura | ......... | F02M 26/42 |
| | | | | 123/568.12 |
| 2010/0170482 A1* | 7/2010 | Feist | ......... | F02M 26/30 |
| | | | | 123/568.12 |
| 2019/0136803 A1* | 5/2019 | So | ......... | F02M 35/1045 |
| 2020/0003107 A1* | 1/2020 | Onodera | ......... | F02M 26/30 |

FOREIGN PATENT DOCUMENTS

| | | | |
|---|---|---|---|
| JP | 2016102429 A | 6/2016 | |
| JP | 2020002798 A | 1/2020 | |

OTHER PUBLICATIONS

European Patent Office, Extended European Search Report Issued in Application No. 21163338.3, dated Jun. 24, 2021, Germany, 8 pages.

\* cited by examiner

INTAKE DEVICE FOR ENGINE

TECHNICAL FIELD

The present invention relates to an intake device for an engine which includes an engine body having a plurality of cylinders aligned in a predetermined direction and is installed in a vehicle in a posture in which the plurality of cylinders are aligned in a front-rear direction of the vehicle.

BACKGROUND ART

An engine has been known which includes an exhaust gas recirculation (EGR) passage returning a portion of exhaust gas as EGR gas to an intake passage for cooling intake air to be supplied to an engine body. For example, Patent Literature 1 discloses an in-line four-cylinder engine in which four cylinders are aligned in line and which has an intake passage, an EGR passage, and an EGR cooler provided in an intermediate portion of the EGR passage and is configured such that EGR gas cooled by the EGR cooler is returned to the intake passage. In this engine, an intake air introduction pipe configuring a portion of the intake passage is disposed in a posture in which it extends in an up-down direction along one side surface of an engine body, the side surface being in an orthogonal direction to a cylinder array direction. Further, an EGR gas introduction channel configuring a portion of the EGR passage on a downstream side of the EGR cooler is disposed in a posture in which it extends in the up-down direction along the intake air introduction pipe.

CITATION LIST

Patent Literature

Patent Literature 1: Japanese Patent Laid-Open No. 2016-102429

SUMMARY OF INVENTION

Problems to be Solved by the Invention

In an engine of Patent Literature 1, the above EGR gas introduction channel is disposed on the outside of the above intake air introduction pipe with respect to an orthogonal direction to a cylinder array direction. Thus, in a case where this engine is installed in a vehicle such that the cylinder array direction agrees with a vehicle width direction, in other words, in a case where the engine is installed in the vehicle in a longitudinal placement state, the intake air introduction pipe and the EGR gas introduction channel are aligned in the vehicle width direction. Thus, traveling air from the front contacts with the EGR gas introduction pipe, and EGR gas which flows through this and has been cooled by an EGR cooler is further cooled. The EGR gas contains water produced by combustion. Thus, when the EGR gas is excessively cooled, condensed water might be produced. When condensed water is introduced together with intake air into an engine body, an adverse influence might occur to combustion.

An object of the present invention is to provide an intake device for an engine that can inhibit excessive cooling of EGR gas.

Means for Solving the Problems

An intake device for an engine according to one aspect of the present invention includes: an engine body having a plurality of cylinders aligned in a predetermined direction and being installed in a vehicle in a posture in which the plurality of cylinders are aligned in a front-rear direction of the vehicle; an intake passage that introduces intake air into the engine body; an exhaust gas recirculation (EGR) passage that returns a portion of exhaust gas exhausted from the engine body to the intake passage; and an EGR cooler that is provided in an intermediate portion of the EGR passage and cools EGR gas as exhaust gas passing through the EGR passage, the intake passage includes a lateral-side intake passage portion provided on one side of the engine body in a vehicle width direction, the EGR passage includes a downstream-side EGR passage portion that defines the EGR passage on a downstream side of the EGR cooler and is provided on the one side of the engine body in the vehicle width direction, and the downstream-side EGR passage portion is disposed such that at least a portion of the downstream-side EGR passage portion is positioned rearward of the lateral-side intake passage portion and overlaps with the lateral-side intake passage portion when seen from a front of the vehicle.

In this intake device, when the engine body is installed in the vehicle in a posture in which the plurality of cylinders are aligned in the front-rear direction of the vehicle, in other words, in a longitudinal placement posture, the lateral-side intake passage portion serves as a windscreen for the downstream-side EGR passage portion, and the lateral-side intake passage portion prevents traveling air from the front from contacting with the downstream-side EGR passage portion. Consequently, the EGR gas which has been cooled by the EGR cooler is inhibited from being further cooled by the traveling air, that is, excessive cooling of the EGR gas is inhibited.

The above intake device for an engine desirably further includes an intercooler that cools intake air passing through the intake passage, and the intercooler is desirably disposed such that the intercooler is opposed to the lateral-side intake passage portion and the downstream-side EGR passage portion with respect to the vehicle width direction and a separation distance from the downstream-side EGR passage portion becomes shorter than a separation distance from the lateral-side intake passage portion with respect to the vehicle width direction.

In this intake device, because the distance between the intercooler and the downstream-side EGR passage portion is short, the temperature of the downstream-side EGR passage portion is maintained by the intercooler which has been at a high temperature by taking heat from the intake air. Consequently, excessive cooling of the EGR gas is more certainly inhibited. Further, because the distance between the intercooler and the lateral-side intake passage portion is short, the lateral-side intake passage portion and the intake air passing through this are inhibited from being warmed by the intercooler at a high temperature. Consequently, the temperature of the intake air is maintained low, and intake efficiency is maintained high.

In the above intake device for an engine, a vehicle accessory is desirably disposed in front of the downstream-side EGR passage portion.

In this intake device, due to collision with the vehicle accessory, the flow of the traveling air is changed so as to be spread to portions around the vehicle accessory when seen from the front. Consequently, contact of the traveling air with the downstream-side EGR passage portion rearward of the vehicle accessory and excessive cooling of the EGR gas in a partial EGR passage are more certainly inhibited.

The vehicle accessory is desirably a first vehicle accessory, and the first vehicle accessory and a second vehicle accessory are desirably disposed in an up-down direction in front of the downstream-side EGR passage portion.

In this intake device, the first vehicle accessory and the second vehicle accessory further disperse the flow of the traveling air, and thereby contact of the traveling air with the downstream-side EGR passage portion and excessive cooling of the EGR gas in the partial EGR passage are further certainly inhibited.

The above intake device for an engine wherein the lateral-side intake passage portion extends upward from a left end portion of the connection portion which is connected the intercooler, and is connected with the intake-air inlet opening of the intake manifold unit in an upper end portion of the intake-side extended portion.

The above intake device for an engine wherein the downstream-side EGR passage portion includes a first section configuring an upper end portion thereof and communicating with the EGR lead-out portion, a second section extending substantially straight downward from the first section, a third section inclined obliquely forward and downward from a lower end portion of the second section, and a fourth section being a lower end portion of the EGR-side extended portion, configuring a downstream end portion of the EGR-side extended portion and the EGR passage, and connected to the third section.

The above intake device for an engine wherein a right-side portion of the lower end portion of the second section is disposed rearward of the intake-side extended portion and in a position overlapping with the intake-side extended portion when seen from the front.

The above intake device for an engine wherein a right-side portion of the third section is disposed rearward of the intake-side extended portion and in a position overlapping with the intake-side extended portion when seen from the front.

Advantageous Effect of Invention

The present invention can provide an intake device for an engine that is capable of inhibiting excessive cooling of EGR gas.

MODE FOR CARRYING OUT THE INVENTION

[General Configuration of Engine]

Figure 1:
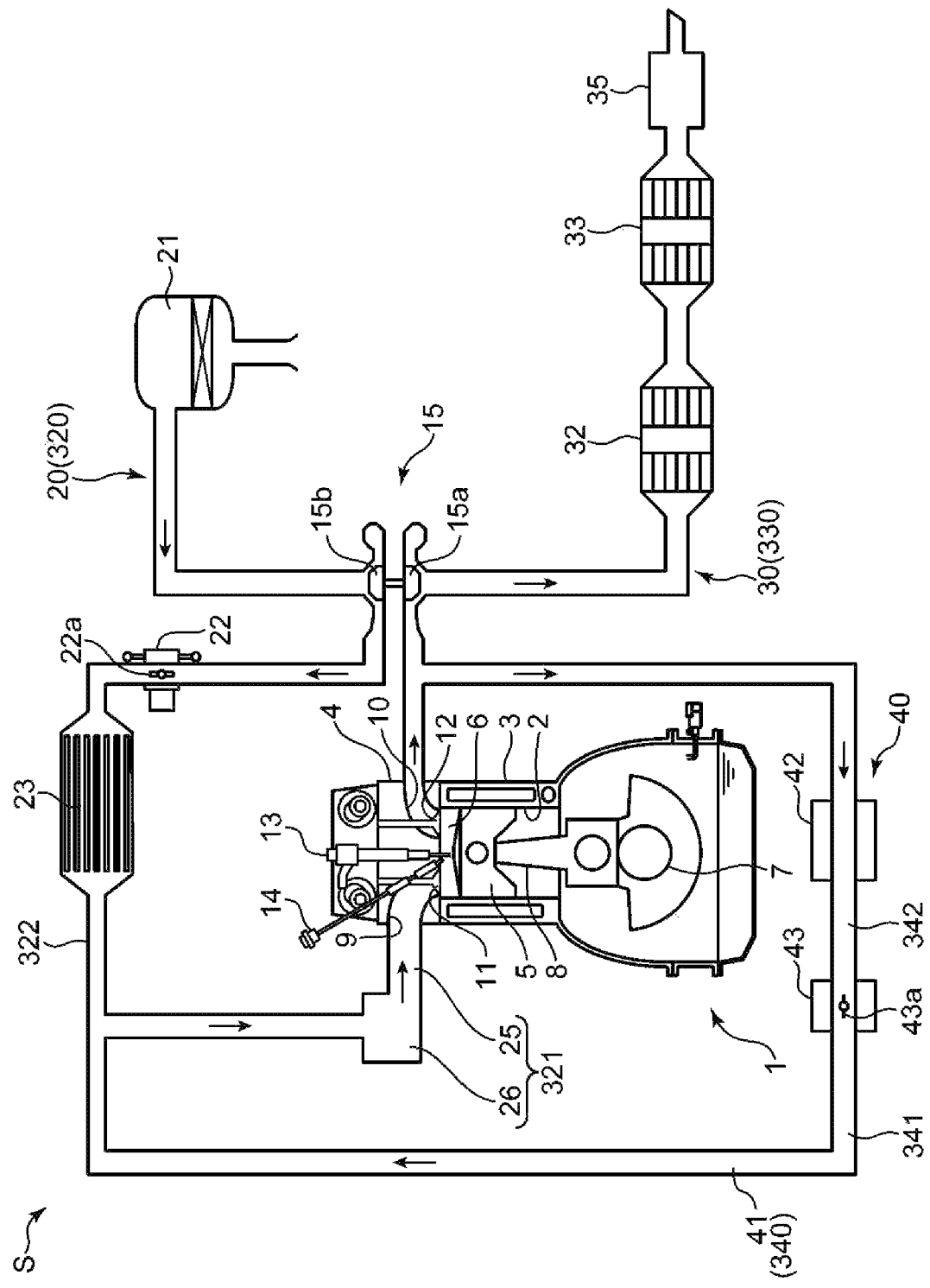
FIG. 1 is a system diagram of an engine to which an intake device according to an embodiment of the present invention is applied.

An intake device 500 for an engine according to the present invention will hereinafter be described in detail with reference to drawings. First, a description will be made about a general configuration of an engine system S to which the intake device 500 for an engine according to the present invention is applied with reference to a system diagram illustrated in FIG. 1. The engine system S illustrated in FIG. 1 is a four-cycle gasoline engine with a turbocharger which is installed in a vehicle as a motive power source for traveling.

The engine system S includes an engine body 1, an intake passage 20 introducing outside air (intake air) into the engine body 1, and an exhaust passage 30 in which exhaust gas exhausted from the engine body 1 flows. In other words, the engine system S includes the engine body 1, an intake passage portion 320 connected with the engine body 1 and defining the intake passage 20, and an exhaust passage portion 330 connected with the engine body 1 and defining the exhaust passage 30. Further, the engine system S includes an exhaust gas recirculation (EGR) device 40 that returns a portion of the exhaust gas flowing through the exhaust passage 30 as EGR gas to the intake passage 20 and an intercooler 23 that cools the intake air passing through the intake passage 20.

The engine body 1 includes a cylinder block 3 having a cylinder 2 formed therein, a cylinder head 4 mounted on an upper surface of the cylinder block 3 so as to close the cylinder 2 from above, and a piston 5 housed in the cylinder 2.

Figure 2:
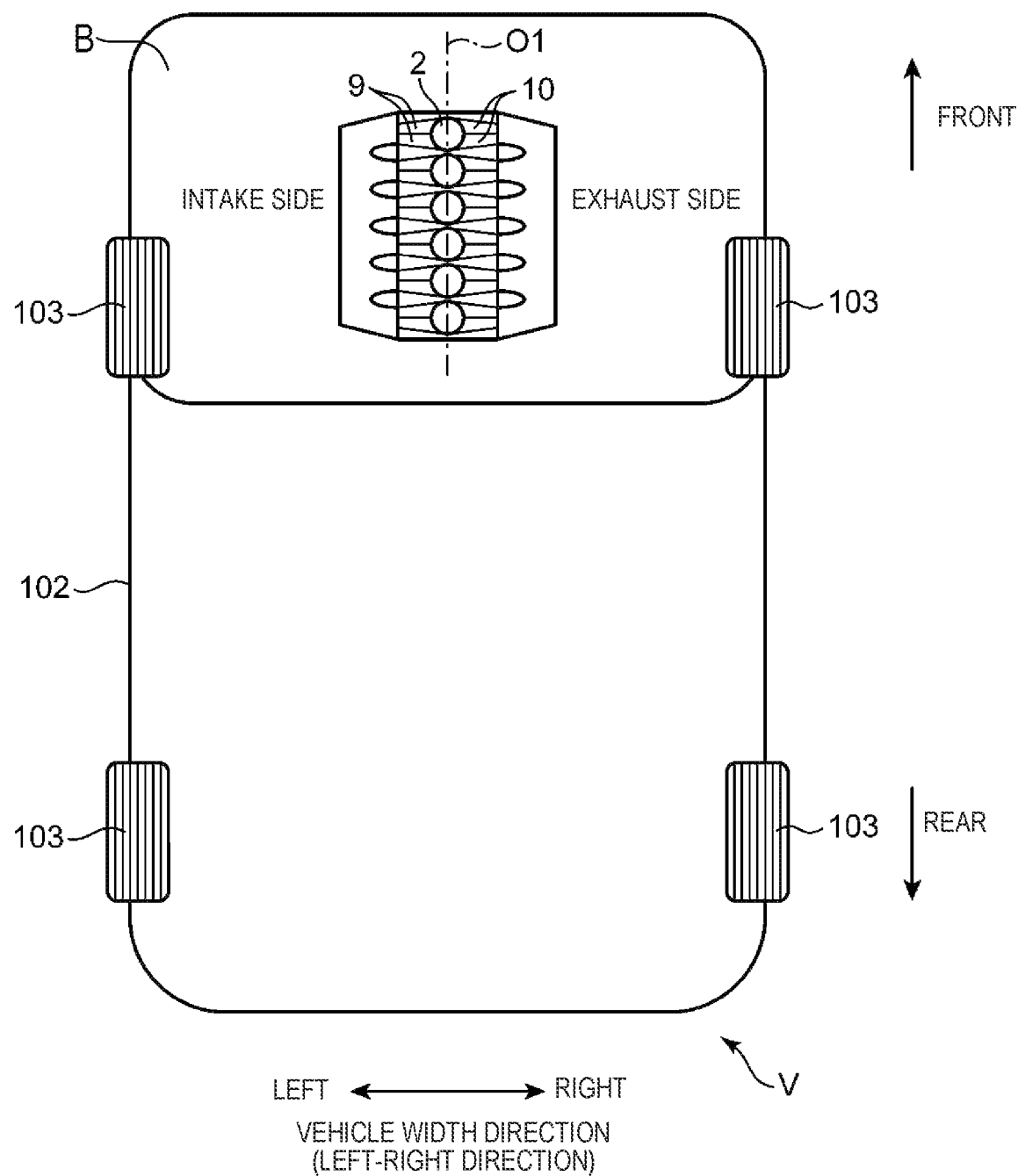
FIG. 2 is a schematic view for explaining a vehicle installation state of an engine body to which the intake device according to the embodiment of the present invention is applied.

FIG. 2 is a schematic view of a vehicle V in which the engine system S is installed. The vehicle V is, for example, a four-wheeled automobile including a vehicle body 102 and four wheels 103 supporting the vehicle body 102. The engine body 1 is installed in an engine bay B provided in a front portion of the vehicle V. The engine body 1 has a plurality of cylinders 2 aligned in a predetermined direction. In the example of FIG. 2, the engine body 1 is an in-line six-cylinder engine having six cylinders 2. As illustrated in FIG. 2, the engine body 1 is disposed in the engine bay B in a posture in which the cylinders 2 are aligned in a front-rear direction of the vehicle V. In other words, the engine body 1 is installed in the vehicle V in a longitudinal placement posture in which an array direction of the cylinders 2 is along the front-rear direction of the vehicle V. Although the engine body 1 has the plurality of cylinders 2 as described above, FIG. 1 illustrates only one cylinder 2 for simplification. In the following, the front-rear direction of the vehicle V will simply be referred to as front-rear direction. Further, in the following, appropriately, a vehicle width direction will be referred to as left-right direction, and right and left in a state where the front is seen from the center of the vehicle V will be set as right and left.

As illustrated in FIG. 1, the piston 5 is housed in the cylinder 2 so as to be capable of reciprocatively sliding in predetermined strokes. Below the piston 5, a crankshaft 7 as an output shaft of the engine body 1 is provided. The crankshaft 7 is connected with the pistons 5 via connecting rods 8 and is driven to rotate around a central axis in response to reciprocating motion of the pistons 5.

A combustion chamber 6 is defined above the piston 5. The combustion chamber 6 is formed with a lower surface of the cylinder head 4, the cylinder 2, and a crown surface of the piston 5. In the cylinder head 4, injectors 13 injecting fuel (mainly gasoline) into the combustion chambers 6 and spark plugs 14 igniting an air-fuel mixture in which the fuel injected from the injectors 13 into the combustion chambers 6 and air introduced into the combustion chambers 6 are mixed together are provided. The air-fuel mixture is combusted in the combustion chamber 6, and the piston 5 pushed down by an expansion force of the combustion performs reciprocating motion in an up-down direction.

In the cylinder head 4, intake ports 9 and exhaust ports 10 communicating with the combustion chambers 6 are formed. In a lower surface of the cylinder head 4, intake-side openings as downstream ends of the intake ports 9 and exhaust-side openings as upstream ends of the exhaust ports 10 are formed. To the cylinder head 4, intake valves 11 opening and closing the above intake-side openings and exhaust valves 12 opening and closing the above exhaust-side openings are attached. As illustrated in FIG. 2, two intake ports 9 and two exhaust ports 10 are provided to one cylinder 2. The intake port 9 and the exhaust port 10 are provided on mutually opposite sides in the left-right direction across an imaginary line O1 extending along the array direction of the cylinders 2. In this embodiment, because the engine body 1 is longitudinally placed as described above, the intake port 9 and the exhaust port 10 are provided on mutually opposite sides in the vehicle width direction across the imaginary line O1 extending in the front-rear direction. In the example of FIG. 2, the intake port 9 is provided on the left side of the imaginary line O1, and the exhaust port 10 is provided on the right side of the imaginary line O1. In the following, appropriately, with respect to the left-right direction (vehicle width direction), the left side of the engine body 1 as a reference will be referred to as intake side, and the right side will be referred to as exhaust side.

The intake passage 20 is a path communicating with the intake ports 9 and supplying the intake air to each of the cylinders 2. Air taken in from an upstream end of the intake passage 20 is introduced into the combustion chambers 6 through the intake passage 20 and the intake ports 9. Specifically, the intake passage 20 has a plurality of independent intake passages 25 configuring downstream end portions thereof and individually communicating with the respective intake ports 9 of the cylinders 2. The intake passage 20 is provided with a surge tank 26 provided on an immediately upstream side of those independent intake passages 25 and defining a space communicating with all of the independent intake passages 25. The intake air is introduced into the space in this surge tank 26, thereafter almost equivalently distributed to the independent intake passages 25, and introduced into the combustion chambers 6 through the independent intake passages 25 and the intake ports 9.

In a portion of the intake passage 20 on an upstream side of the surge tank 26, in order from the upstream side, an air cleaner 21, a compressor 15b of a turbocharger 15, a throttle valve unit 22, and the intercooler 23 are arranged.

The air cleaner 21 removes foreign substances in the intake air and purifies the intake air. The throttle valve unit 22 includes a throttle valve 22a. The throttle valve 22a opens and closes the intake passage 20 while moving in accordance with a pedaling action of an accelerator not illustrated and adjusts a flow amount of the intake air in the intake passage 20. The turbocharger 15 sends the intake air to the downstream side of the intake passage 20 while compressing the intake air.

The intercooler 23 cools the intake air compressed by the turbocharger 15. The intercooler 23 is of a water-cooled type, and the intake air is cooled by heat exchange between the intake air introduced into the intercooler 23 and cooling water.

The exhaust passage 30 is a path communicating with the exhaust ports 10 and discharging burned gas (exhaust gas) produced in the combustion chambers 6 to the outside of the vehicle V. In the exhaust passage 30 (exhaust passage portion 330), in order from the upstream side, a turbine 15a of the turbocharger 15, an upstream catalytic converter 32, a downstream catalytic converter 33, and a muffler 35 are arranged. In the upstream catalytic converter 32, a three-way catalyst for performing purification of harmful components (HC, CO, and $NO_x$) contained in the exhaust gas and a GPF (gasoline particulate filter) for collecting particulate matters (PM) contained in the exhaust gas are provided. In the downstream catalytic converter 33, an appropriate catalyst such as a three-way catalyst or a $NO_x$ catalyst is provided.

The turbocharger 15 includes the compressor 15b arranged in the intake passage 20 and the turbine 15a arranged in the exhaust passage 30. The turbine 15a rotates by receiving energy of the exhaust gas flowing through the exhaust passage 30. The compressor 15b rotates while moving in accordance with this, and air flowing in the intake passage 20 is thereby compressed (supercharged).

The EGR device 40 is a device realizing so-called high pressure EGR and includes an EGR passage 41 connecting the exhaust passage 30 and the intake passage 20 together and returning a portion of the exhaust gas exhausted from the engine body 1 to the intake passage 20. In other words, the EGR device 40 includes an EGR passage portion 340 defining such an EGR passage 41. The EGR passage 41 connects a portion of the exhaust passage 30 on an upstream side of the turbine 15a with a portion of the intake passage 20 between the intercooler 23 and the surge tank 26.

The EGR device 40 includes an EGR cooler 42 and an EGR valve unit 43 which are provided in the EGR passage 41. The EGR cooler 42 cools the EGR gas passing through the EGR passage 41 by heat exchange. The EGR valve unit 43 includes an EGR valve 43a. The EGR valve 43a adjusts a flow amount of the exhaust gas flowing through the EGR passage 41. In this embodiment, the EGR valve 43a is provided in a portion of the EGR passage 41 on a downstream side of the EGR cooler 42.

[Disposition Structure of Intake Side of Engine Body 1]

Figure 3:
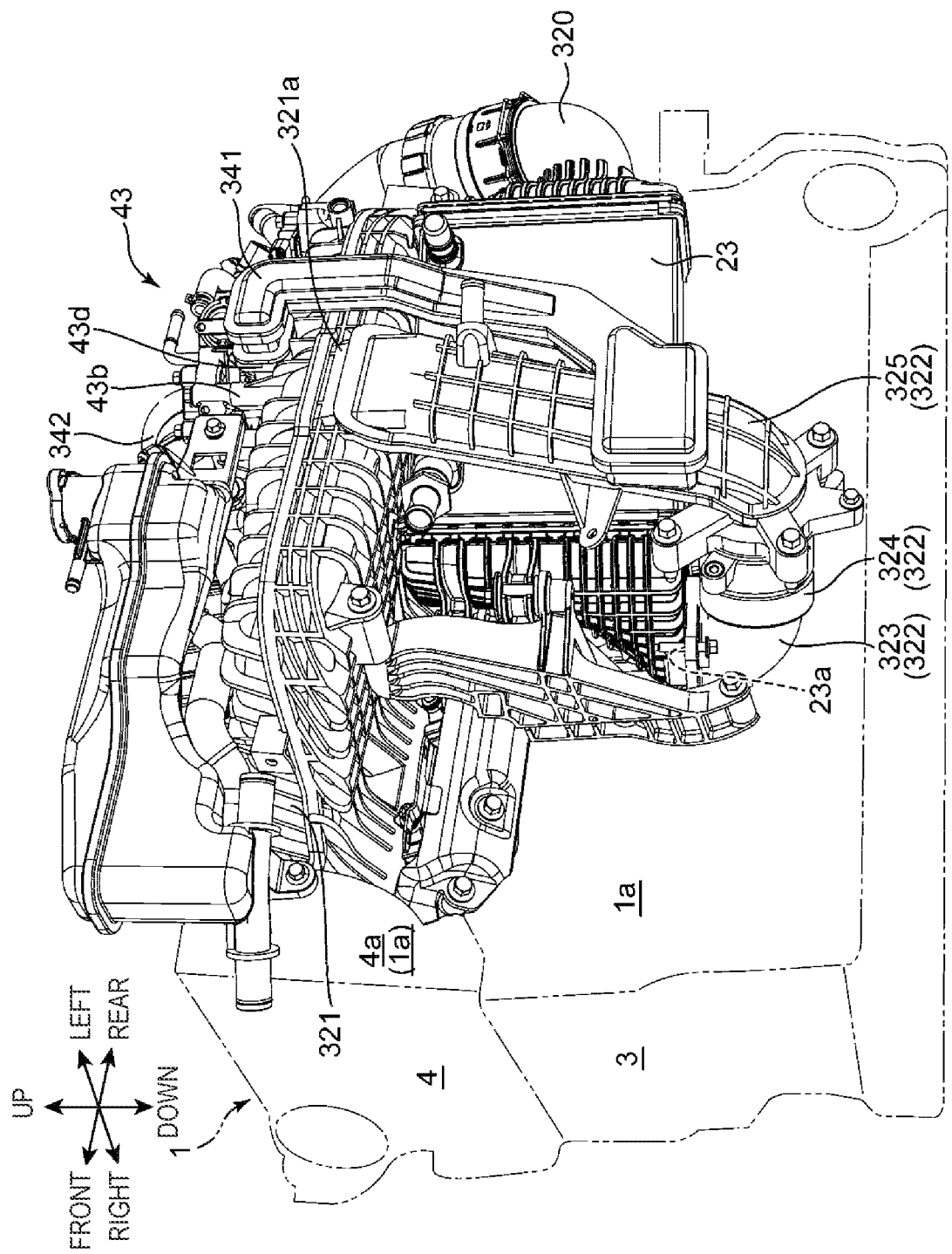
FIG. 3 is a schematic perspective view of the intake device according to the embodiment of the present invention.
Figure 4:
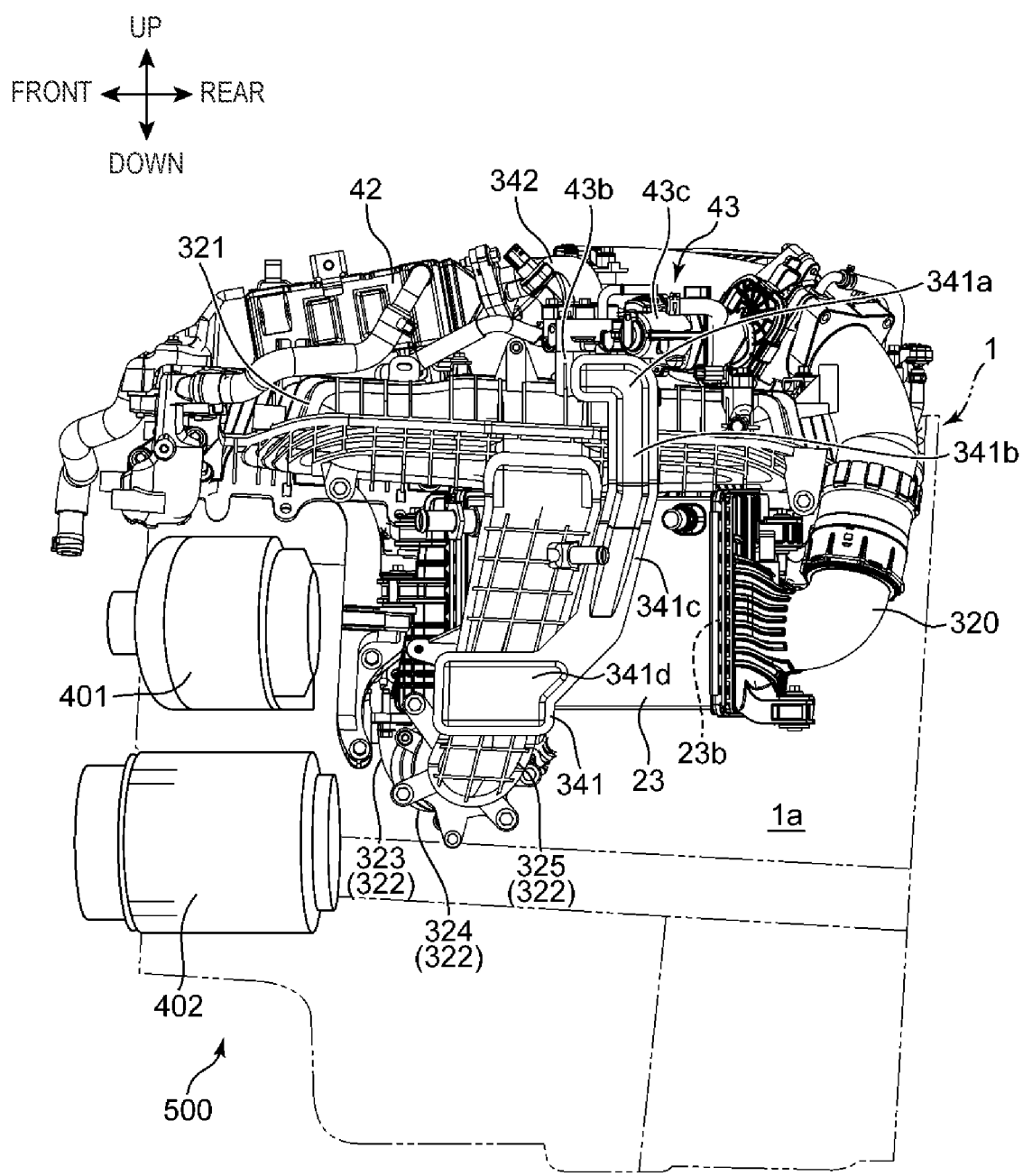
FIG. 4 is a schematic side view of the intake device as seen from an intake side.
Figure 5:
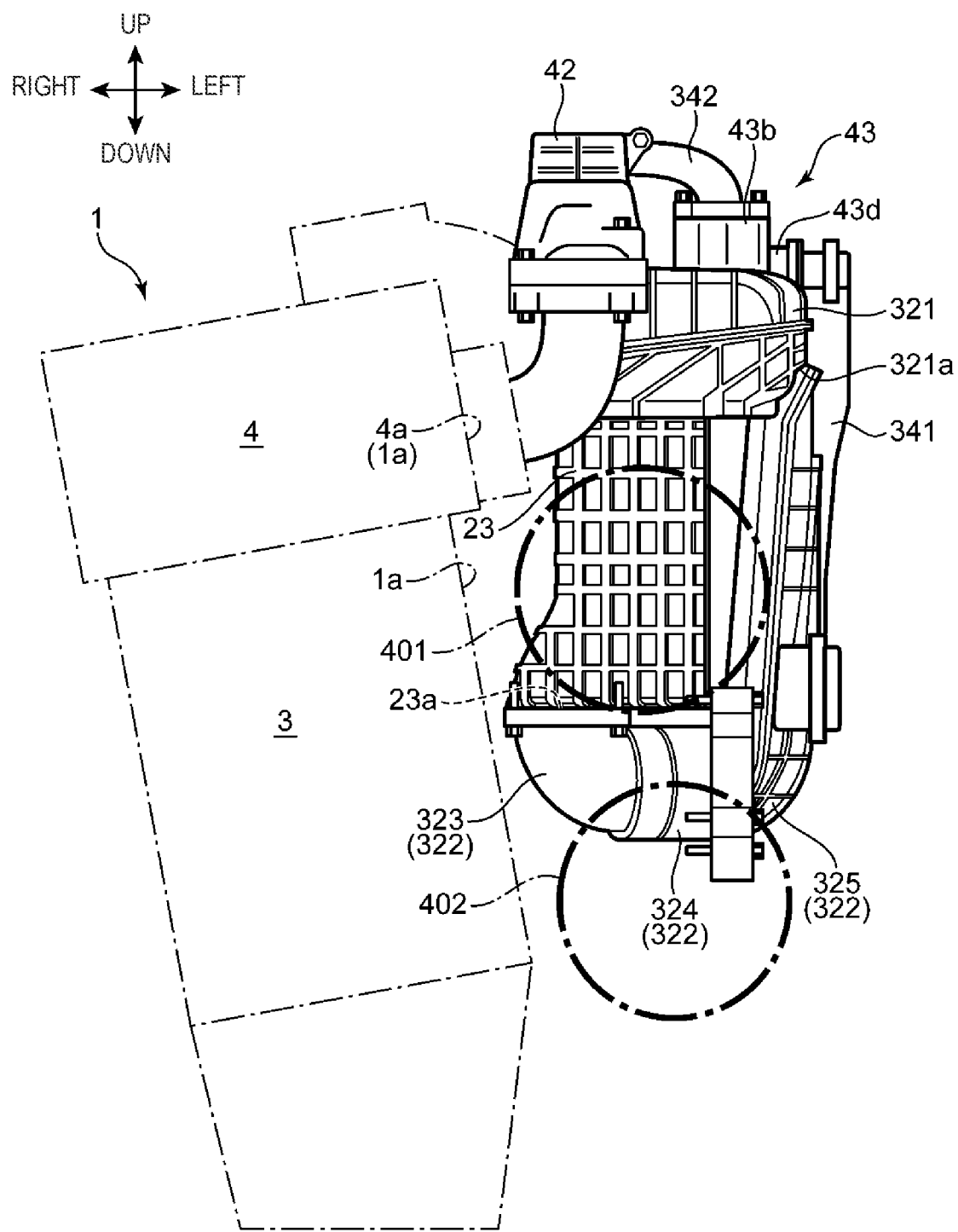
FIG. 5 is a schematic front view of the intake device as seen from the front.
Figure 6:
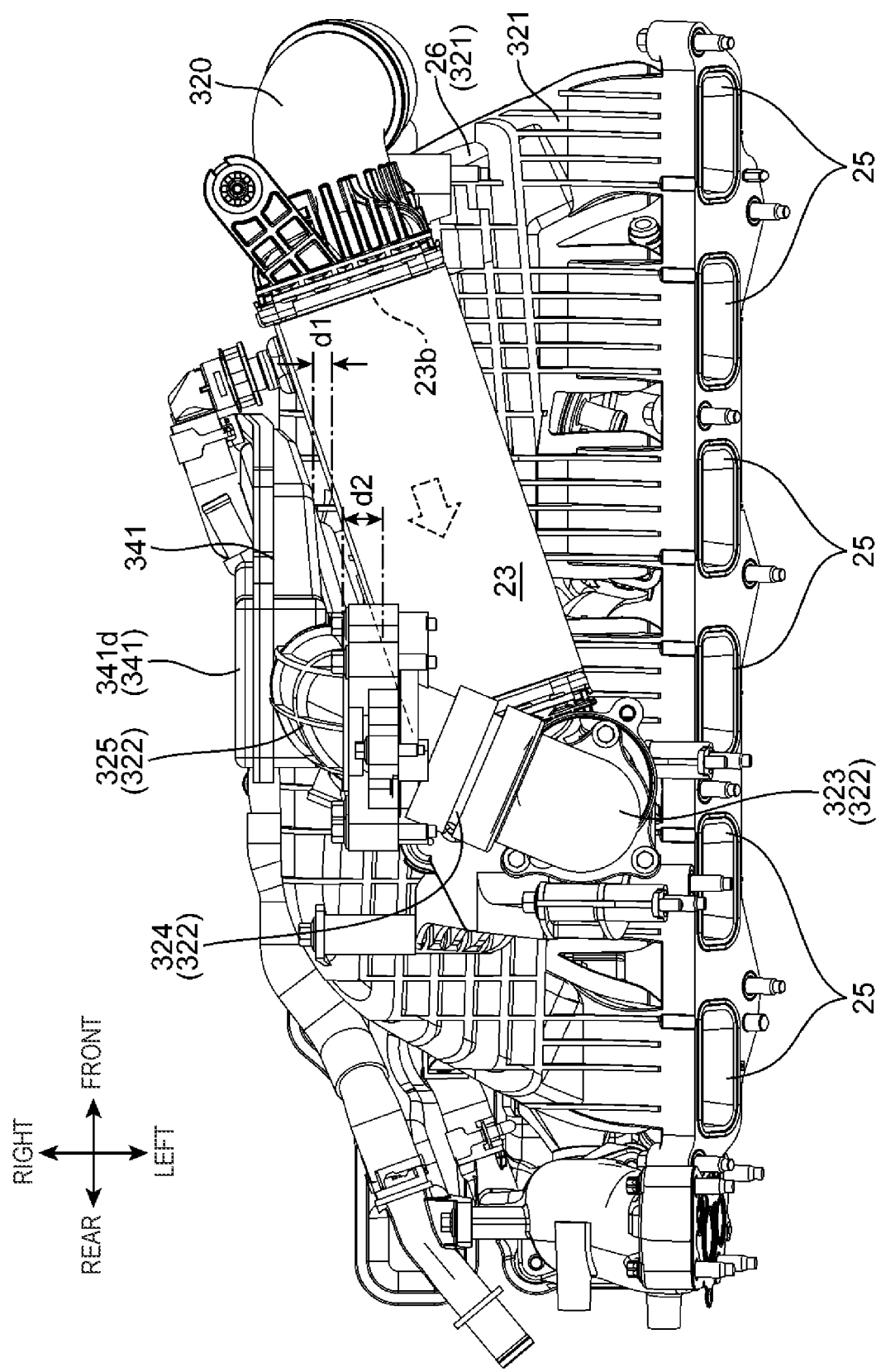
FIG. 6 is a schematic bottom view of a portion of the intake device as seen from below.
Figure 7:
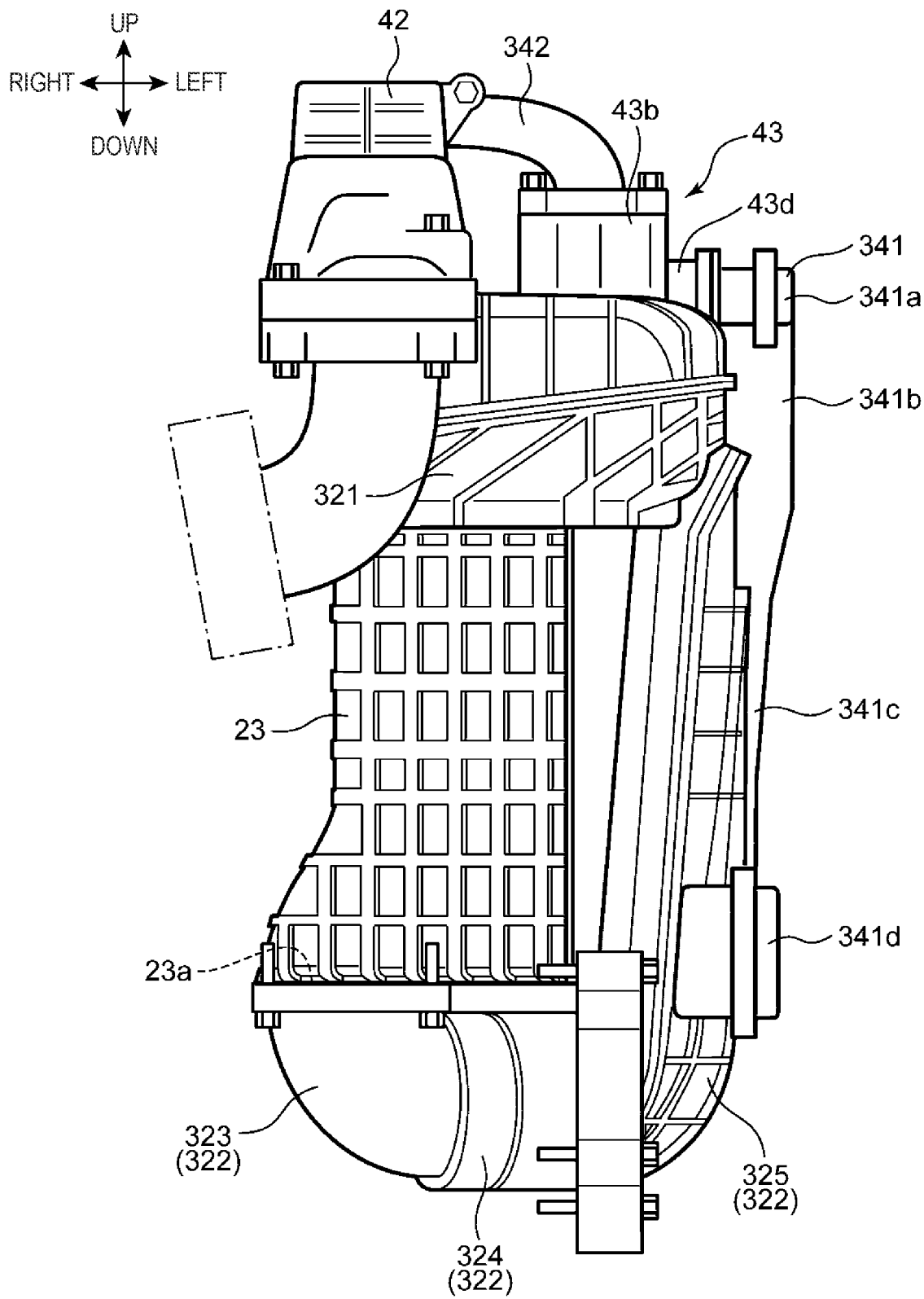
FIG. 7 is an enlarged view of a portion of FIG. 4.

Next, details of the intake device 500 will be described. FIG. 3 is a schematic perspective view illustrating a portion of the intake device 500 according to the embodiment of the present invention, the intake device 500 being disposed on the intake side of the engine body 1. FIG. 4 is a schematic side view of the intake device 500 as seen from the intake side. FIG. 5 is a schematic front view of the intake device 500 as seen from the front. FIG. 6 is a schematic bottom view of a portion of the intake device 500 as seen from below. FIG. 7 is an enlarged view of a portion of FIG. 4. The intake device 500 according to the embodiment of the present invention includes the above intercooler 23, an EGR-side extended portion 341 described later in the above EGR passage 41 (EGR passage portion 340), an intake-side extended portion 325 described later in the above intake passage 20 (intake passage portion 320), and an alternator 401 and an air-conditioner compressor 402 which will be described later. Note that in FIG. 3, the alternator 401 and air-conditioner compressor 402 which will be described later are not illustrated.

An intake manifold unit 321 is mounted on a side surface 1a of the engine body 1 on the intake side. The intake manifold unit 321 is a component inside which the independent intake passages 25 and the space communicating with those independent intake passages 25 are defined. In other words, in this embodiment, in the intake passage 20, a portion being a so-called intake manifold and defining the independent intake passages 25 and the surge tank 26 defining the space communicating with the independent intake passages 25 are integrated and are formed as the intake manifold unit 321. The intake manifold unit 321 has a shape extending from a portion around a front end of the cylinder head 4 to a portion around a back end and swelling leftward from a side surface 4a of the cylinder head 4 on the intake side. The independent intake passages 25 are defined in a right-side portion, of the intake manifold unit 321, close to the engine body 1, and a left-side portion of the intake manifold unit 321 configures the surge tank 26. At a general center of a left-side end portion of the intake manifold unit 321 in the front-rear direction, an intake-air inlet opening 321a is provided which is for introducing the intake air into the intake manifold unit 321 (surge tank 26). In this embodiment, the intake-air inlet opening 321a opens obliquely leftward and downward.

The intercooler 23 is disposed below the intake manifold unit 321 and in a space between the side surface 1a of the engine body 1 on the intake side and the intake-side extended portion 325 and EGR-side extended portion 341 which will be described later. The intercooler 23 exhibits a general rectangular cuboid as an external shape. The intercooler 23 is fixed to the side surface 1a of the engine body 1 on the intake side in a posture in which an upper surface thereof is along a lower surface of the intake manifold unit 321. Further, as illustrated in FIG. 6, the intercooler 23 is fixed in a posture in which it is inclined obliquely forward and rightward, in other words, in a posture in which it is inclined to approach the engine body 1 more toward a front side.

In a front portion of the lower surface of the intercooler 23, a lead-out opening 23a is formed which is for leading out the intake air cooled by the intercooler 23 to the outside of the intercooler 23. On the intake side of the engine body 1, a downstream-side intake passage portion 322 is provided which connects this lead-out opening 23a with the intake-air inlet opening 321a of the intake manifold unit 321 and defines the intake passage 20 between the intercooler 23 and the surge tank 26.

The downstream-side intake passage portion 322 includes an intercooler lead-out portion 323 coupled with the lead-out opening 23a of the intercooler 23, the intake-side extended portion 325 coupled with the intake-air inlet opening 321a of the intake manifold unit 321, and a connection portion 324 connecting those intercooler lead-out portion 323 and intake-side extended portion 325 together.

The intercooler lead-out portion 323 is fixed to the lower surface of the intercooler 23. The intercooler lead-out portion 323 extends downward from the lower surface, of the intercooler 23, in which the lead-out opening 23a of the intercooler 23 is formed. The intercooler lead-out portion 323 is curved while swelling obliquely downward and rightward, and a downstream end thereof opens leftward.

The connection portion 324 extends leftward from a left end portion (downstream end portion) of the intercooler lead-out portion 323. The connection portion 324 extends to a portion around a left edge of a front surface of the intercooler 23.

The intake-side extended portion 325 extends upward from a left end portion of the connection portion 324 and is connected with the intake-air inlet opening 321a of the intake manifold unit 321 in an upper end portion of the intake-side extended portion 325. The connection portion 324 is disposed in a lower position than the intercooler 23, and the intake-side extended portion 325 extends from a position below the intercooler 23 to a position above this position through a portion on the left of the intercooler 23. In this embodiment, when seen from the intake side as illustrated in FIG. 4, the intake-side extended portion 325 is inclined obliquely forward and downward. This intake-side extended portion 325 is an example of a "lateral-side intake passage portion" of the present disclosure. Note that an introduction opening 23b for introducing the intake air to an internal portion of the intercooler 23 is formed in a lower portion of a rear surface of the intercooler 23, and a portion of the intake passage 20 on an upstream side of the intercooler 23 is connected with this introduction opening 23b. Accordingly, as indicated by the broken-line arrow in FIG. 6, the intake air moves forward in the intercooler 23.

On the intake side of the engine body 1, the EGR-side extended portion 341 is disposed which configures a portion of the EGR passage 41 on a downstream side of the EGR valve unit 43. The EGR-side extended portion 341 has a shape extending in the up-down direction. The EGR-side extended portion 341 is disposed on the left of the intake manifold unit 321 and the intercooler 23. This EGR-side extended portion 341 is an example of a "downstream-side EGR passage portion" of the present disclosure.

The EGR valve unit 43 is disposed above the intake manifold unit 321. The EGR valve unit 43 has a housing 43b defining a portion of the EGR passage 41, the EGR valve 43a disposed in this housing 43b, and a drive part 43c driving the EGR valve 43a. In the housing 43b of the EGR valve unit 43, an EGR lead-out portion 43d is provided which is provided in a position on a downstream side of the EGR valve 43a and leads out the EGR gas passing through this to the outside. The EGR lead-out portion 43d opens leftward. The EGR-side extended portion 341 communicates with this EGR lead-out portion 43d and extends downward from the EGR lead-out portion 43d through a portion on the left of the intercooler 23. Note that the EGR valve unit 43 is connected with the EGR cooler 42 provided above the intake manifold unit 321 via an EGR gas piping 342.

The EGR-side extended portion 341 includes a first section 341a configuring an upper end portion thereof and communicating with the EGR lead-out portion 43d, a fourth section 341d being a lower end portion of the EGR-side extended portion 341 and configuring a downstream end portion of the EGR-side extended portion 341 and the EGR passage 41, a second section 341b extending almost straight downward from the first section 341a, and a third section 341c inclined obliquely forward and downward from a lower end portion of the second section 341b and connected with the fourth section 341d.

The fourth section 341d is connected with a middle portion of the intake-side extended portion 325 in the up-down direction. The fourth section 341d has a shape covering a peripheral surface of this middle portion of the intake-side extended portion 325 in the up-down direction from the left. In this embodiment, the fourth section 341d is connected with a portion corresponding to approximately one quarter from the bottom of the intake-side extended portion 325 (corresponding to approximately a quarter of the length of the intake-side extended portion 325 in the up-down direction).

Figure 8:
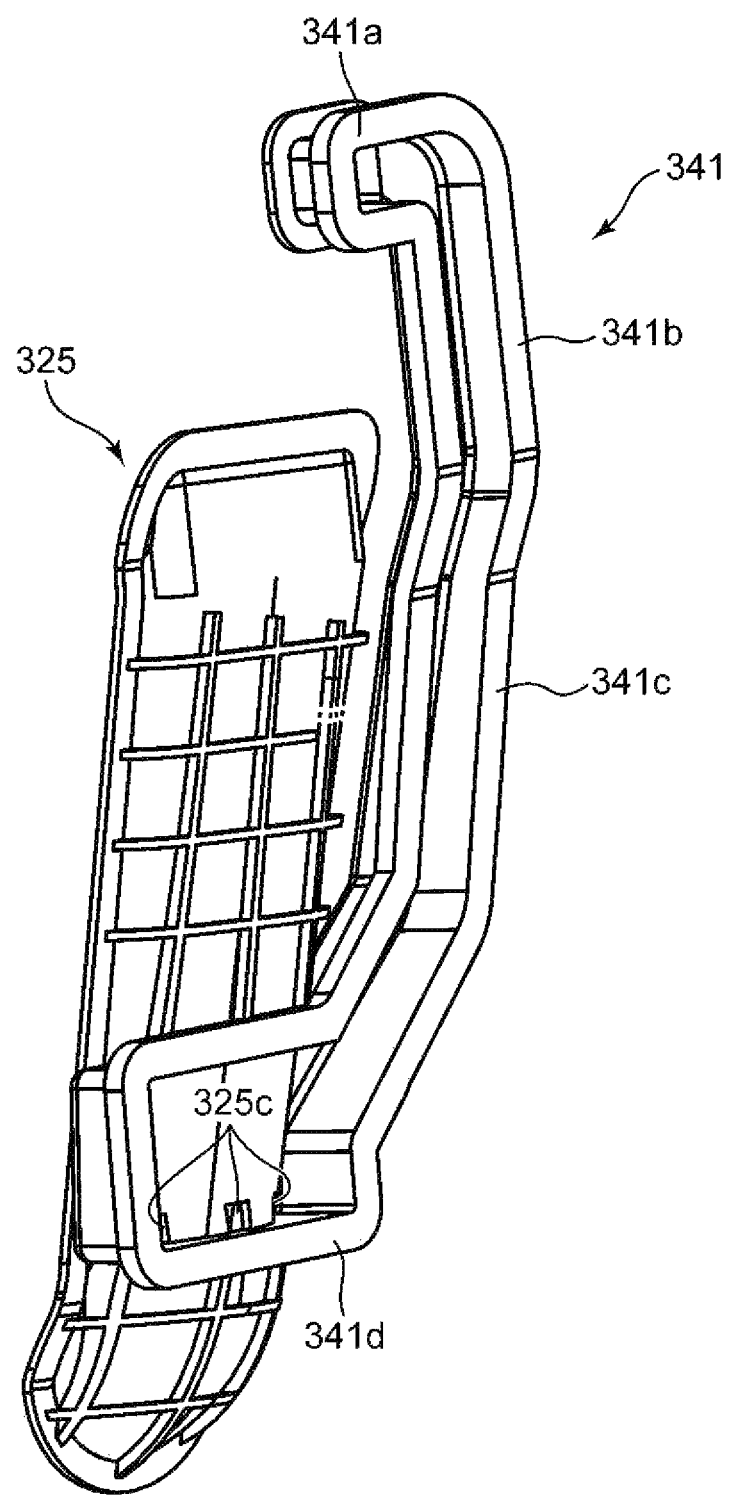
FIG. 8 is a diagram illustrating an EGR-side extended portion in a state where a cap member is detached and a portion of an intake-side extended portion together.

In this embodiment, the EGR-side extended portion 341 is configured with a section integrally formed with a right-side portion of the intake-side extended portion 325 and a cap member covering this section from the left. FIG. 8 is a schematic perspective view illustrating the EGR-side extended portion 341 in a state where the cap member is detached and the right-side portion of the intake-side extended portion 325 together. As illustrated in FIG. 8, FIG. 7, and so forth, the fourth section 341d has a shape swelling leftward from a peripheral surface of the intake-side extended portion 325, and a space is formed between the fourth section 341d and the peripheral surface of the intake-side extended portion 325. In the peripheral surface of the intake-side extended portion 325, the peripheral surface being opposed to the fourth section 341d, a plurality through holes 325c passing through a peripheral wall of the intake-side extended portion 325 are formed along a circumferential direction of the intake-side extended portion 325. The EGR gas in the fourth section 341d and the EGR-side extended portion 341 is introduced into an inside of the intake-side extended portion 325 through the through holes 325c. In other words, the EGR gas in the EGR passage 41 is introduced into the intake passage 20 via the through holes 325c.

The first section 341a has a shape extending rearward from the EGR lead-out portion 43d when seen from the intake side as illustrated in FIG. 4. When seen from the intake side, the EGR lead-out portion 43d is disposed above a rear portion of an upper edge of the intake-side extended portion 325, and the first section 341a extends from a position opposed to the rear portion of the upper edge of the intake-side extended portion 325 to a position rearward of a rear edge of the intake-side extended portion 325.

The second section 341b extends from a lower end of the first section 341a to a position below the upper edge of the intake-side extended portion 325. The second section 341b extends downward from a rear portion of the first section 341a, which is a portion positioned rearward of the intake-side extended portion 325 in the front-rear direction. Accordingly, when seen from the intake side, the lower end portion of the second section 341b is disposed on a rear side of the intake-side extended portion 325. In other words, the second section 341b is disposed so as to pass through a portion rearward of the intake-side extended portion 325.

Figure 9:
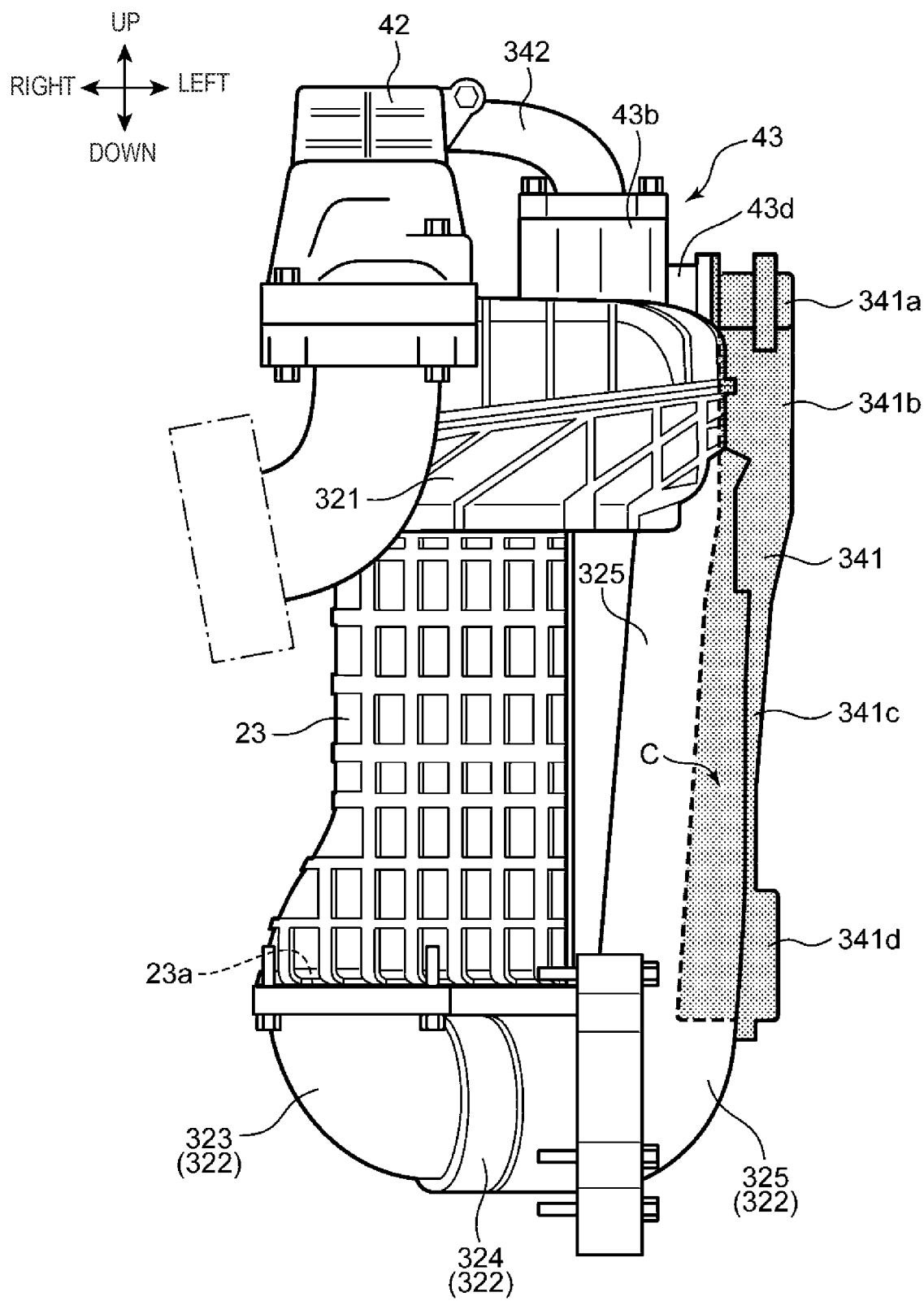
FIG. 9 is a diagram corresponding to FIG. 7 and illustrating an overlapping region between the EGR-side extended portion and the intake-side extended portion.

FIG. 9 is a diagram corresponding to FIG. 7 and is a diagram which depicts the EGR-side extended portion 341 and the intake-side extended portion 325 by only contour lines and thereby clearly indicates a region in which those overlap with each other in the front-rear direction. As illustrated in FIG. 9, a right-side portion of the lower end portion of the second section 341b is disposed rearward of the intake-side extended portion 325 and in a position overlapping with the intake-side extended portion 325 when seen from the front.

The third section 341c is inclined obliquely forward and downward from a lower end of the second section 341b along the rear edge of the intake-side extended portion 325. As illustrated in FIG. 9, a right-side portion of the third section 341c is also disposed rearward of the intake-side extended portion 325 and in a position overlapping with the intake-side extended portion 325 when seen from the front.

A right-side portion of a lower end portion of the third section 341c is connected with the peripheral surface of the intake-side extended portion 325. Meanwhile, a left-side portion of the third section 341c is connected with an upper portion of a rear end portion of the fourth section 341d.

As described above, in this embodiment, a portion of the EGR-side extended portion 341, specifically, a region C including a lower end portion of the first section 341a and the right-side portion of the third section 341c is disposed rearward of the intake-side extended portion 325 and in a position overlapping with the intake-side extended portion 325 when seen from the front.

Here, as described above, the intercooler 23 is disposed in a region between the side surface 1a of the engine body 1 on the intake side and the intake-side extended portion 325 and EGR-side extended portion 341. Further, as described above, the EGR-side extended portion 341 is disposed so as to extend in the up-down direction through a portion rearward of the intake-side extended portion 325. Moreover, as described above, the intercooler 23 is disposed in a posture in which it is inclined obliquely forward and rightward. Accordingly, as illustrated in FIG. 6, with respect to the left-right direction, a separation distance d1 between the intercooler 23 and the EGR-side extended portion 341 is shorter than a separation distance d2 between the intercooler 23 and the intake-side extended portion 325.

On the intake side of the engine body 1, the alternator 401 as one of vehicle accessories and the air-conditioner compressor 402 as one of the vehicle accessories, similarly, are further provided. The alternator 401 is the vehicle accessory generating electricity by being driven by the engine body 1. The air-conditioner compressor 402 is the vehicle accessory for raising a pressure of a coolant for an air conditioner by being driven with power received from a battery installed in the vehicle V. The above alternator 401 is an example of a "first vehicle accessory" of the present disclosure, and the above air-conditioner compressor 402 is an example of a "second vehicle accessory" of the present disclosure.

Both of the alternator 401 and the air-conditioner compressor 402 have external shapes in generally columnar shapes and are disposed on the intake side of the engine body 1 in postures in which central axes thereof extend in the front-rear direction. Further, the alternator 401 and the air-conditioner compressor 402 are juxtaposed in the up-down direction. In this embodiment, as illustrated in FIG. 5, the alternator 401 is disposed in front of the intercooler 23 so as to overlap with this in the front-rear direction. Moreover, the air-conditioner compressor 402 is disposed below this alternator 401.

Operation and Effects

As described above, in this embodiment, on the intake side of the engine body 1 disposed in the vehicle V in a longitudinal placement posture, in other words, on one side in the vehicle width direction, the intake-side extended portion 325 configuring a portion of the intake passage 20 and the EGR-side extended portion 341 defining the EGR passage 41 on the downstream side of the EGR cooler 42 are disposed. Moreover, a portion of the EGR-side extended portion 341 is disposed so as to be positioned rearward of the intake-side extended portion 325 and so as to overlap with the intake-side extended portion 325 when seen from the front of the vehicle V.

Accordingly, the intake-side extended portion 325 functions as a windscreen against traveling air to the EGR-side extended portion 341. That is, the intake-side extended portion 325 prevents the traveling air from a vehicle front from contacting with the EGR-side extended portion 341. Consequently, the EGR gas which has been cooled by the EGR cooler 42 is inhibited from being further cooled by the traveling air, and excessive cooling of the EGR gas is inhibited.

Specifically, an EGR cooler 362 has to have a cooling capability being capable of sufficiently cooling the EGR gas in a high-load operation. Thus, when the EGR gas which has passed through the EGR cooler 362 is further cooled by the traveling air in a medium or low load case or the like, the EGR gas is excessively cooled, water contained in the EGR gas is condensed, and a large amount of condensed water might be produced. Introduction of condensed water into the engine body 1 may lead to, for example, unstable combustion of the air-fuel mixture in the engine body 1, which is not preferable. On the other hand, in this embodiment, because excessive cooling of the EGR gas can be inhibited as described above, production of a large amount of condensed water, unstable combustion, and so forth can be inhibited.

Furthermore, in this embodiment, the intercooler 23 is disposed such that the intake-side extended portion 325 is opposed to the EGR-side extended portion 341 with respect to the vehicle width direction. Moreover, the intercooler 23 is disposed such that the separation distance d1 in the vehicle width direction between the intercooler 23 and the EGR-side extended portion 341 becomes shorter than the separation distance d2 in the vehicle width direction between the intercooler 23 and the intake-side extended portion 325.

Accordingly, excessive cooling of the EGR gas is more certainly inhibited. Specifically, the intake air flowing into the intercooler 23 is pressurized by the turbocharger 15 and is thus at a considerably high temperature compared to the cooled EGR gas. Accordingly, because the temperature of the intercooler 23 receiving the heat of this intake air is high and the EGR-side extended portion 341 is provided in a position close to this, the temperature of the EGR-side extended portion 341 is maintained by radiant heat from the intercooler 23. Consequently, excessive cooling of the EGR gas passing through the EGR-side extended portion 341 is more certainly inhibited.

In particular, in this embodiment, because the intake air moves forward in the intercooler 23, the temperature of an upstream-side portion of the intercooler 23 in a state where the intake air has not been cooled yet, in other words, the temperature of a rear-side portion of the intercooler 23 is higher than the temperature of a downstream-side, in other words, front-side portion of the intercooler 23. Moreover, the EGR-side extended portion 341 is disposed rearward of the intake-side extended portion 325 and adjacently to this portion of the intercooler 23 at a comparatively high temperature. Accordingly, excessive cooling of the EGR gas is further certainly inhibited.

Further, the intake-side extended portion 325 is provided in a far position from the intercooler 23 as described above, and the temperature of the intake air passing through the intake-side extended portion 325 is thereby inhibited from being raised by the heat from the intercooler 23. Accordingly, the temperature of the intake air is maintained low, and intake efficiency of the engine body 1 is maintained high.

In addition, in this embodiment, the alternator 401 and the air-conditioner compressor 402 are disposed in front of the EGR-side extended portion 341.

In this arrangement, the traveling air from the vehicle front collides with the alternator 401 and the air-conditioner compressor 402 in a position in front of the EGR-side extended portion 341, and in this position, flow directions thereof are changed so as to be spread in the vehicle width direction. Accordingly, the traveling air toward the EGR-side extended portion 341 is further reduced to a small amount. Consequently, in this embodiment, cooling of the EGR-side extended portion 341 and the EGR gas passing through this due to the traveling air is further certainly inhibited.

In particular, in this embodiment, the alternator 401 and the air-conditioner compressor 402 are juxtaposed in the up-down direction. In other words, compared to a case where only either one of the alternator 401 and the air-conditioner compressor 402 is disposed, when seen from the vehicle front, a front region of the EGR-side extended portion 341 is closed in a wider range. Accordingly, in this embodiment, the flow of the traveling air can further certainly be dispersed to portions around the engine body 1, and cooling of the EGR-side extended portion 341 and the EGR gas passing through this is still more certainly inhibited.

Modifications

In the above embodiment, a description is made about a case where a portion of the EGR-side extended portion 341 is rearward of the intake-side extended portion 325 and overlaps with this in the front-rear direction; however, the whole EGR-side extended portion 341 may be disposed so as to be rearward of the intake-side extended portion 325 and so as to overlap with this in the front-rear direction.

In the above embodiment, a description is made about a case where the alternator 401 and the air-conditioner compressor 402 are disposed side by side in the up-down direction in front of the EGR-side extended portion 341; however, either one of the alternator 401 and the air-conditioner compressor 402 may be omitted. Further, instead of the alternator 401 and the air-conditioner compressor 402, another vehicle accessory may be disposed in front of the EGR-side extended portion 341.

It is sufficient that the engine body 1 is an in-line multi-cylinder engine, and the number of cylinders is not limited to six, as described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST 1 engine body
20 intake passage
23 intercooler
41 EGR passage
42 EGR cooler
325 intake-side extended portion (lateral-side intake passage portion)
341 EGR-side extended portion (downstream-side EGR passage portion)
401 alternator (vehicle accessory)
402 air-conditioner compressor (vehicle accessory)

The invention claimed is:
1. An engine system with an intake device, the engine system comprising:
   an engine body having a plurality of cylinders aligned in a predetermined direction and installed in a vehicle in a posture in which the plurality of cylinders are aligned in a front-rear direction of the vehicle;

an intake passage that introduces intake air into the engine body;

an exhaust gas recirculation (EGR) passage that returns a portion of exhaust gas exhausted from the engine body to the intake passage; and an EGR cooler that is provided in an intermediate portion of the EGR passage and cools EGR gas as exhaust gas passing through the EGR passage, wherein the intake passage includes a lateral-side intake passage portion provided on one side of the engine body in a vehicle width direction, the EGR passage includes a downstream-side EGR passage portion that defines the EGR passage on a downstream side of the EGR cooler and is provided on the one side of the engine body in the vehicle width direction, and the downstream-side EGR passage portion is disposed such that at least a portion of the downstream-side EGR passage portion is positioned rearward of the lateral-side intake passage portion and overlaps with the lateral-side intake passage portion when seen from a front of the vehicle.

2. The engine system according to claim 1, further comprising: an intercooler that cools intake air passing through the intake passage, wherein the intercooler is disposed such that the intercooler is opposed to the lateral-side intake passage portion and the downstream-side EGR passage portion with respect to the vehicle width direction and a separation distance in the vehicle width direction between the intercooler and the downstream-side EGR passage portion is shorter than a separation distance in the vehicle width direction between the intercooler and the lateral-side intake passage portion.

3. The engine system according to claim 2, wherein a vehicle accessory is disposed in front of the downstream-side EGR passage portion.

4. The engine system according to claim 3, wherein
the vehicle accessory is a first vehicle accessory, and
the first vehicle accessory and a second vehicle accessory are disposed in an up-down direction in front of the downstream-side EGR passage portion.

5. The engine system according to claim 1, wherein a vehicle accessory is disposed in front of the downstream-side EGR passage portion.

6. The engine system according to claim 5, wherein
the vehicle accessory is a first vehicle accessory, and
the first vehicle accessory and a second vehicle accessory are disposed in an up-down direction in front of the downstream-side EGR passage portion.

7. The engine system according to claim 1, wherein the lateral-side intake passage portion extends upward from a left end portion of the connection portion which is connected the intercooler, and is connected with the intake-air inlet opening of the intake manifold unit in an upper end portion of the intake-side extended portion.

8. The engine system according to claim 1, wherein the downstream-side EGR passage portion includes:
a first section configuring an upper end portion thereof and communicating with the EGR lead-out portion;
a second section extending substantially straight downward from the first section;
a third section inclined obliquely forward and downward from a lower end portion of the second section; and
a fourth section being a lower end portion of the EGR-side extended portion, configuring a downstream end portion of the EGR-side extended portion and the EGR passage, and connected to the third section.

9. The engine system according to claim 8, wherein a right-side portion of the lower end portion of the second section is disposed rearward of the intake-side extended portion and in a position overlapping with the intake-side extended portion when seen from the front.

10. The engine system according to claim 8, wherein a right-side portion of the third section is disposed rearward of the intake-side extended portion and in a position overlapping with the intake-side extended portion when seen from the front.

11. The engine system according to claim 8, wherein the lateral-side intake passage portion extends upward from a left end portion of the connection portion which is connected the intercooler, and is connected with the intake-air inlet opening of the intake manifold unit in an upper end portion of the intake-side extended portion.

12. The engine system according to claim 9, wherein the lateral-side intake passage portion extends upward from a left end portion of the connection portion which is connected the intercooler, and is connected with the intake-air inlet opening of the intake manifold unit in an upper end portion of the intake-side extended portion.

13. The engine system according to claim 10, wherein the lateral-side intake passage portion extends upward from a left end portion of the connection portion which is connected the intercooler, and is connected with the intake-air inlet opening of the intake manifold unit in an upper end portion of the intake-side extended portion.

* * * * *